United States Patent
Lee et al.

(10) Patent No.: US 8,275,774 B2
(45) Date of Patent: Sep. 25, 2012

(54) STREAMING QUERY SYSTEM AND METHOD FOR EXTENSIBLE MARKUP LANGUAGE

(75) Inventors: Hahn-Ming Lee, Taipei (TW); Li-Zhen Liu, Taipei (TW); Chieh-Hung Lin, Taipei (TW); Jerome Yeh, Taipei (TW); Chia-Hsin Huang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 144 days.

(21) Appl. No.: 12/842,622

(22) Filed: Jul. 23, 2010

(65) Prior Publication Data

US 2011/0035398 A1  Feb. 10, 2011

(30) Foreign Application Priority Data

Aug. 4, 2009  (TW) .............................. 98126158 A

(51) Int. Cl.
*G06F 7/00* (2006.01)
*G06F 17/30* (2006.01)
(52) U.S. Cl. .................... 707/739; 707/741; 707/755
(58) Field of Classification Search ................ 707/739, 707/741, 755
See application file for complete search history.

(56) References Cited

U.S. PATENT DOCUMENTS

| | | | |
|---|---|---|---|
| 2004/0010752 A1* | 1/2004 | Chan et al. ................. | 715/513 |
| 2004/0060007 A1* | 3/2004 | Gottlob et al. ............. | 715/513 |
| 2004/0261019 A1* | 12/2004 | Imamura et al. ........... | 715/513 |

* cited by examiner

*Primary Examiner* — Mariela Reyes

(57) ABSTRACT

A streaming query system for extensible markup language is provided. An XPath query translator receives and analyzes a user-input XPath document. An abstract syntax tree analyzer establishes an abstract syntax tree. A XML parser receives and parses an XML document. An index generator generates an index for the XML document. A computation module performs a format calculation based on the abstract syntax tree and the index, and generates a query result accordingly.

8 Claims, 5 Drawing Sheets

STREAMING QUERY SYSTEM AND METHOD FOR EXTENSIBLE MARKUP LANGUAGE

CROSS REFERENCE TO RELATED APPLICATIONS

This application claims priority of Taiwan Patent Application Ser. No. 098126158, filed 2009 Aug. 4. The contents of the application are hereby incorporated by reference.

BACKGROUND

The invention relates to computer systems and methods and in particular to a streaming query system and method for extensible markup language.

This section is intended to introduce the reader to various aspects of the art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read given said understanding, and not as admissions of prior art.

Extensible Markup Language (XML) has become a standard format for exchanging information among various applications on the Internet. According to a conventional method of processing an XML document, when an XML document exceeds available memory capacity of a system, the system fails to process the XML document. According to the conventional method, even when an XML document does not exceed the available memory capacity of the system, processing the XML document may cause a heavy burden on the system.

Accordingly, an effective processing method for extensible markup language is needed.

SUMMARY

Certain aspects commensurate in scope with the claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A streaming query system for extensible markup language is provided. An XPath query translator receives and analyzes a user-input XPath (Extensible Markup Language Path Language) document. An abstract syntax tree builder receives a result obtained from the analyzing process of the XPath query translator, and builds an abstract syntax tree accordingly. An XML parser receives an Extensible Markup Language (XML) and parses nodes of the XML document. An index generator generates an index of the XML document according to the result obtained by the analyzing process of the XML parser. A computation module receives the abstract syntax tree built by the abstract syntax tree builder, performs a format computation and obtains a query result accordingly.

A streaming query method for extensible markup language is provided. The method comprises the steps of: receiving and analyzing a user-input XPath (Extensible Markup Language Path Language) document; receiving a result obtained by analyzing the XPath document, and building an abstract syntax tree accordingly; receiving an Extensible Markup Language (XML) document, and parsing nodes of the XML document; generating an index of the XML document according to the result obtained by analyzing the XML document; and receiving the abstract syntax tree and the index, performing a format computation and obtaining a query result accordingly.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those with ordinary skill in the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple Figures. It should be understood that many of the elements described and illustrated throughout the specification are functional in nature and may be embodied in one or more physical entities or may take other forms beyond those described or depicted.

Figure 1:
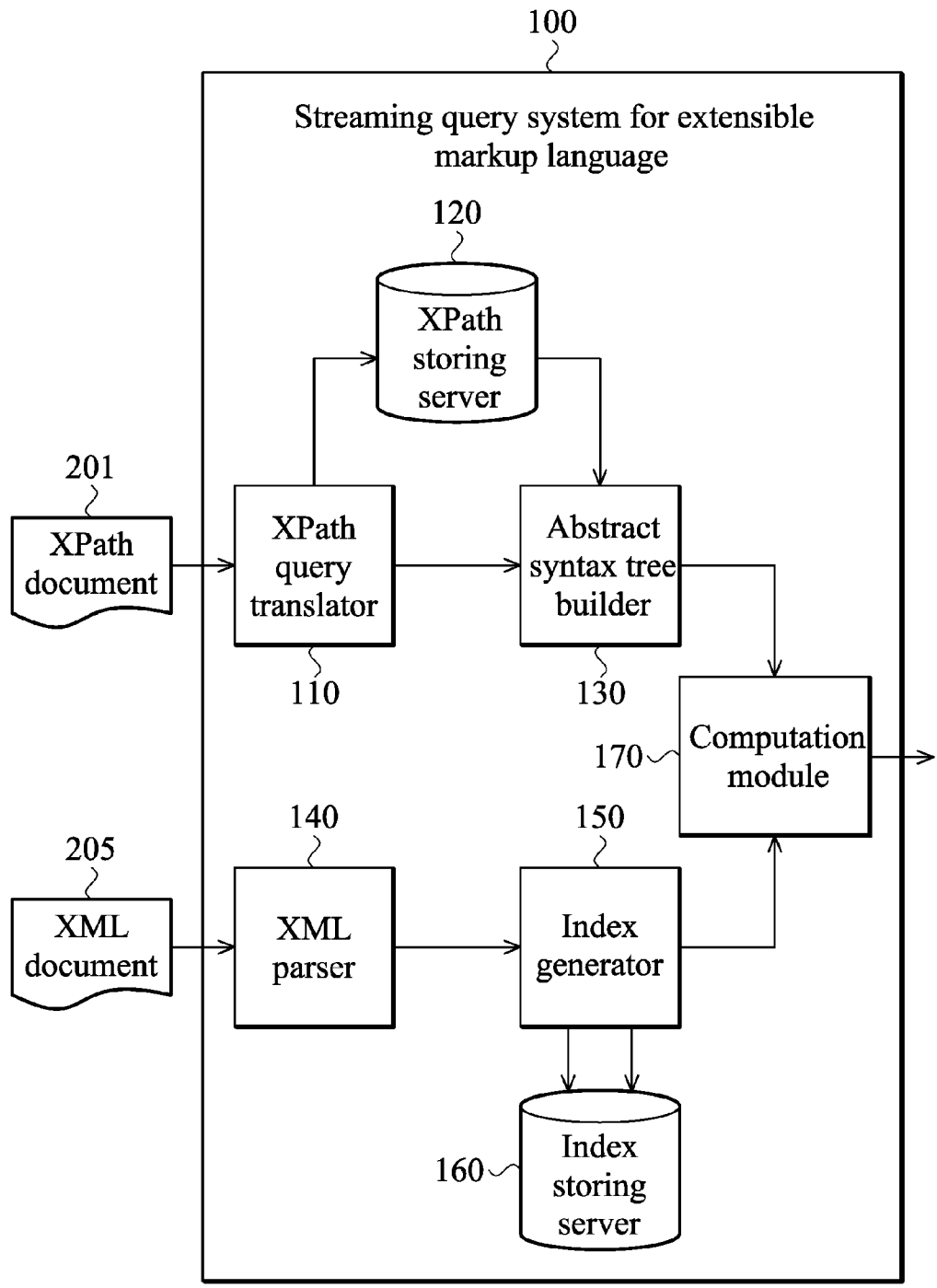
FIG. 1 is a schematic view of an embodiment of a streaming query system for extensible markup language.

FIG. 1 is a schematic view of an embodiment of a streaming query system for extensible markup language.

As shown in FIG. 1, the streaming query system for extensible markup language 100 (hereinafter referred to as query system 100) comprises: an XPath query translator 110, an XPath storing server 120, an abstract syntax tree builder 130, an XML parser 140, an index generator 150, an index storing server 160, and a computation module 170.

The XPath query translator 110 receives a user-input XPath (Extensible Markup Language Path Language) document 201, and analyzes the XPath document 201. The XPath query translator 110 transmits a result obtained by the analyzing process to XPath storing server 120 and abstract syntax tree builder 130.

The so-called XPath (Extensible Markup Language Path Language) is a query language used to navigate through elements and attributes in an XML document. The XPath language is based on a tree representation of the XML document, and provides the ability to navigate around the tree, selecting nodes by a variety of criteria. According to XPath expression, an axis defines a node-set relative to the current node in an XML document. For example, axes of XPath expression comprises: (a) forward axes, such as child, descendent, descendant-or-self, following, following-sibling; (b) backward axes, such as parent, ancestor, ancestor-or-self, preceding, and preceding-sibling.

The so-called XML (Extensible Markup Language) document was designed to transport and store data.

The XPath storing server 120 stores results obtained by the analyzing process performed by XPath query translator 110 for further use.

The abstract syntax tree builder 130 receives a result obtained from the analyzing process of the XPath query translator 110, and builds an abstract syntax tree accordingly. The abstract syntax tree builder 130 comprises an abstract syntax tree establishing unit 131 and an abstract syntax tree dividing unit 133.

The abstract syntax tree establishing unit 131 receives the result obtained from the analyzing process of the XPath query translator 110, and establishes a single tree structure accordingly. The tree structure is established for ascertaining parent nodes, ancestor nodes, child nodes, descendant nodes, preceding nodes, following nodes, etc.

Figure 2:
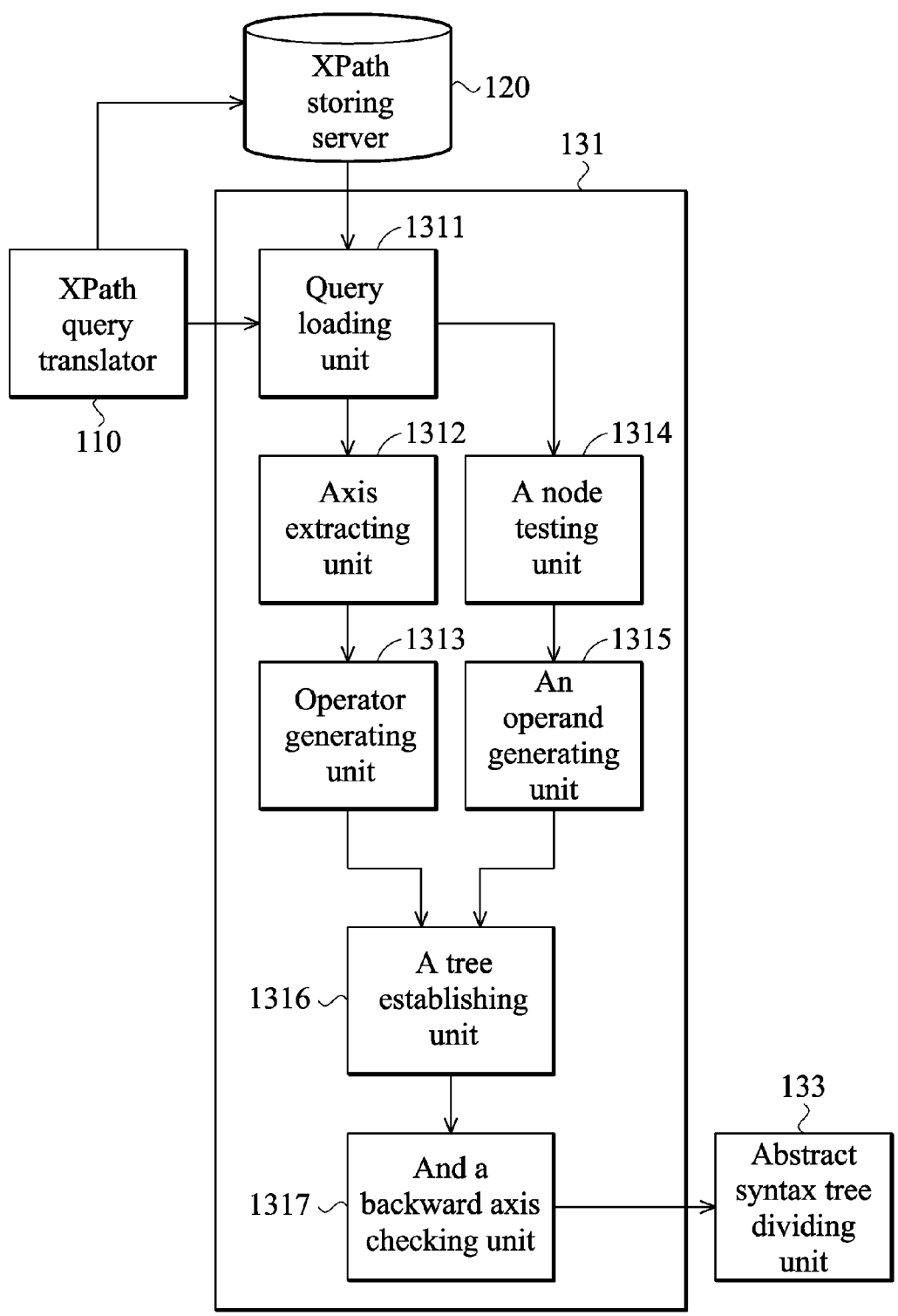
FIG. 2 is a schematic view of components within the abstract syntax tree establishing unit.

FIG. 2 is a schematic view of components within the abstract syntax tree builder of FIG. 1.

The abstract syntax tree establishing unit 131 comprises a query loading unit 1311, an axis extracting unit 1312, an operator generating unit 1313, a node testing unit 1314, an operand generating unit 1315, a tree establishing unit 1316, and a backward axis checking unit 1317.

When receiving a query string input by a user, the query loading unit 1311 loads one line of the query string at a time, rather than loading all of the input query strings at the same time.

The axis extracting unit 1312 receives the loaded query string, and extracts an axis of the loaded query string.

The operator generating unit 1313 receives a result obtained from the axis extracting unit 1312 and generates an operator accordingly. The operator comprises: a child node, a parent node, a descendant node, a following node, a preceding node, a preceding sibling node, a following sibling node.

The node testing unit 1314 receives the query string loaded by the query loading unit 1311 and performing a node test accordingly. The node test checks a particular node name or a general representation of a node The operand generating unit 1315 receives a result obtained from the node testing unit 1314, retrieves an operand thereof, and assigns an unspecified variable to the operand.

The tree establishing unit 1316 establishes a tree structure according to the operator generated by the operator generating unit 1313 and the operand generated by the operand generating unit 1315. The operand in the tree structure specifies relationship among nodes, and the operator is a tag specifies characteristics of the node.

The backward axis checking unit 1317 receives the tree structure established by the tree establishing unit, determines whether a backward axis exists in the operand. For example, if the operand comprises a parent node and/or an ancestor node (i.e., a backward axis exists in the operand), the tree structure built by the tree establishing unit 1316 is reversed. On the other hand, if the operand does not comprise a backward axis, the original tree structure built by the tree establishing unit 1316 is maintained. The tree structure processed by the backward axis checking unit 1317 is then transmitted to the abstract syntax tree dividing unit 133.

The abstract syntax tree dividing unit 133 divides the single tree structure established by the abstract syntax tree establishing unit 131 into independent and undividable tree-structure components. The processed result obtained from the abstract syntax tree dividing unit 133 is then transmitted to computation module 170.

Figure 3:
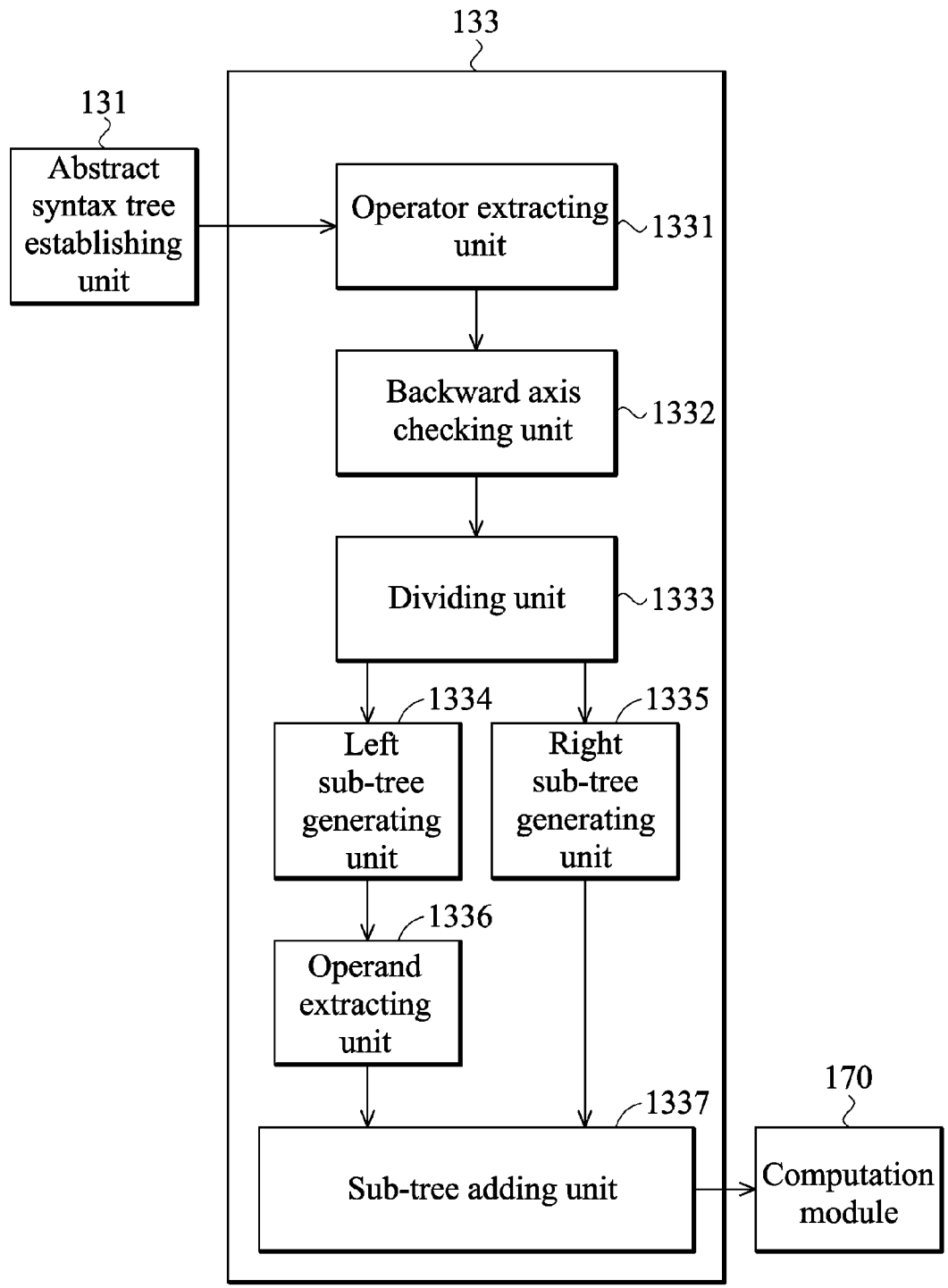
FIG. 3 is a schematic view of components within the abstract syntax tree dividing unit.

FIG. 3 is a schematic view of components within the abstract syntax tree dividing unit.

The abstract syntax tree dividing unit 133 comprises: an operator extracting unit 1331, a backward axis checking unit 1332, a dividing unit 1333, a left sub-tree generating unit 1334, a right sub-tree generating unit 1335, an operand extracting unit 1336, a sub-tree adding unit 1337.

The operator extracting unit 1331 receives the single tree structure established by the abstract syntax tree establishing unit 131, and extracts the operators from the single tree structure.

The backward axis checking unit 1332 receives a result obtained by the operator extracting unit 1331, and determines whether a backward axis exists in the result using a Boolean value. For example, if a backward axis exists, the Boolean value is set as 'T' (backward axes are ascertained), otherwise the Boolean value is set as 'F' (no backward axis is ascertained).

The dividing unit 1333 receives a result obtained by the backward axis checking unit 1332, separates the linking part of the backward axis in the tree structure, and transmits the divided smaller tree structures to the left sub-tree generating unit 1334 and right sub-tree generating unit 1335.

The original tree structure is a binary tree structure, wherein each node is connected to at most two sub-trees, the sub-tree on the left side is a left sub-tree and the sub-tree on the right side is a right sub-tree. Each node has its left sub-tree, wherein the left sub-tree might be an empty set. Here, the dividing process involves non-empty left sub-trees. Similarly, each node has its right sub-tree, wherein the right sub-tree might be an empty set. Here, the dividing process involves non-empty right sub-trees.

The left sub-tree generating unit 1334 receives a result obtained by the dividing unit 1333, and separates a left sub-tree from the tree structure; the right sub-tree generating unit 1335 receives a result obtained by the dividing unit 1333, and separates a right sub-tree from the tree structure.

The operand extracting unit 1336 receives a result obtained by the left sub-tree generating unit 1334, determines a main structure of the tree structure, and retrieves the second operand counted backward.

The sub-tree adding unit 1337 retrieves results obtained from the right sub-tree generating unit 1335 and the operand extracting unit 1336, adds the right sub-tree to the left sub-tree to establish a new tree structure, and transmits the newly generated tree structure to the computation module 170. The reason why the right sub-tree is added to the left sub-tree is that, when the tree is divided, the left side of the right sub-tree is an empty set, therefore contents of the left sub-tree are filled in the right sub-tree.

The XML parser 140 receives an Extensible Markup Language (XML) document 205, parses nodes of the XML document 205, and transmits the parsed result to index generator 150.

The index generator 150 generates an index of the XML document according to the result obtained by the analyzing process of the XML parser 140. The index is then transmitted to index storing server 160 and computation module 170.

The index storing server 160 stores the index generated by the index generator 150.

The computation module 170 receives the abstract syntax tree built by the abstract syntax tree builder 133 and the index generated by index generator 150, performs a format computation and obtains a query result accordingly.

Figure 4A:
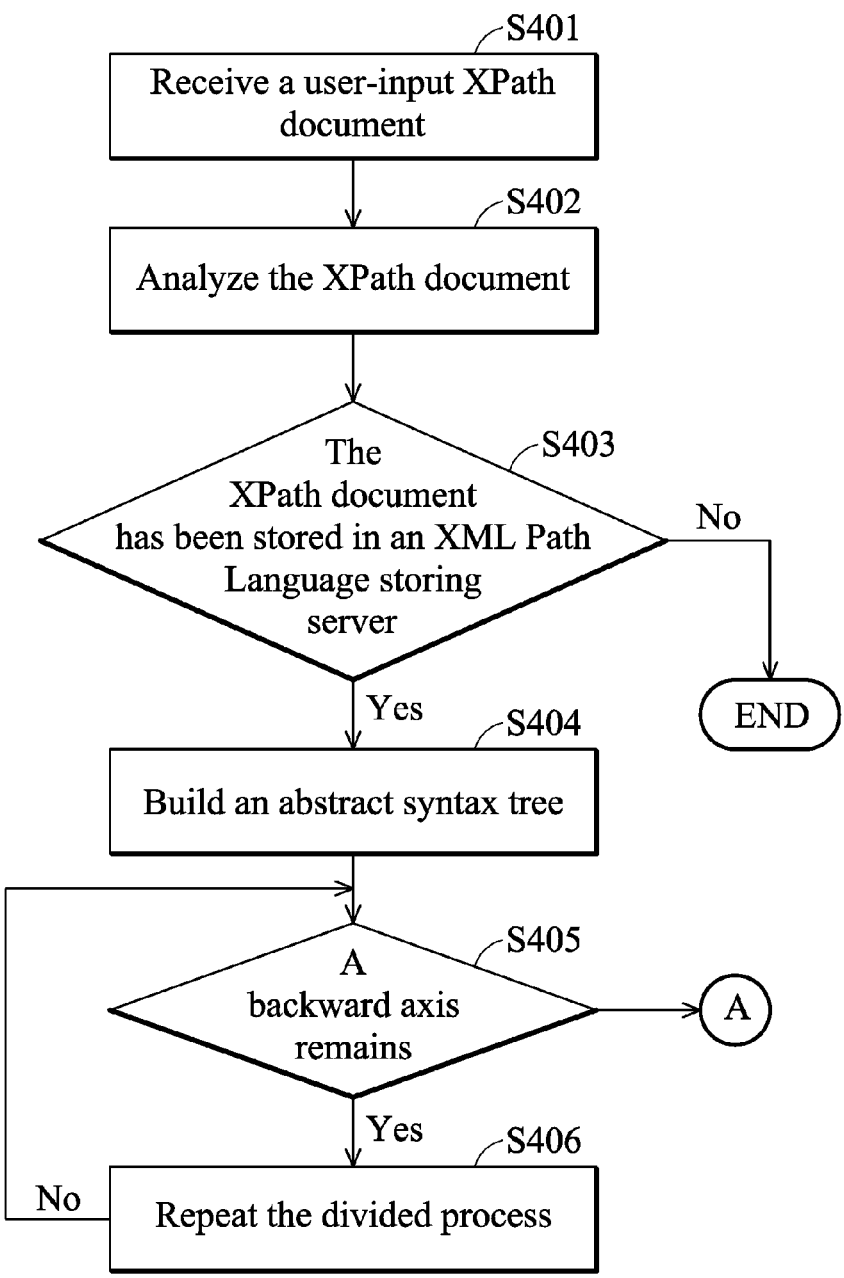
FIGS. 4A and 4B are flowcharts of an embodiment of the streaming query system for extensible markup language.
Figure 4B:
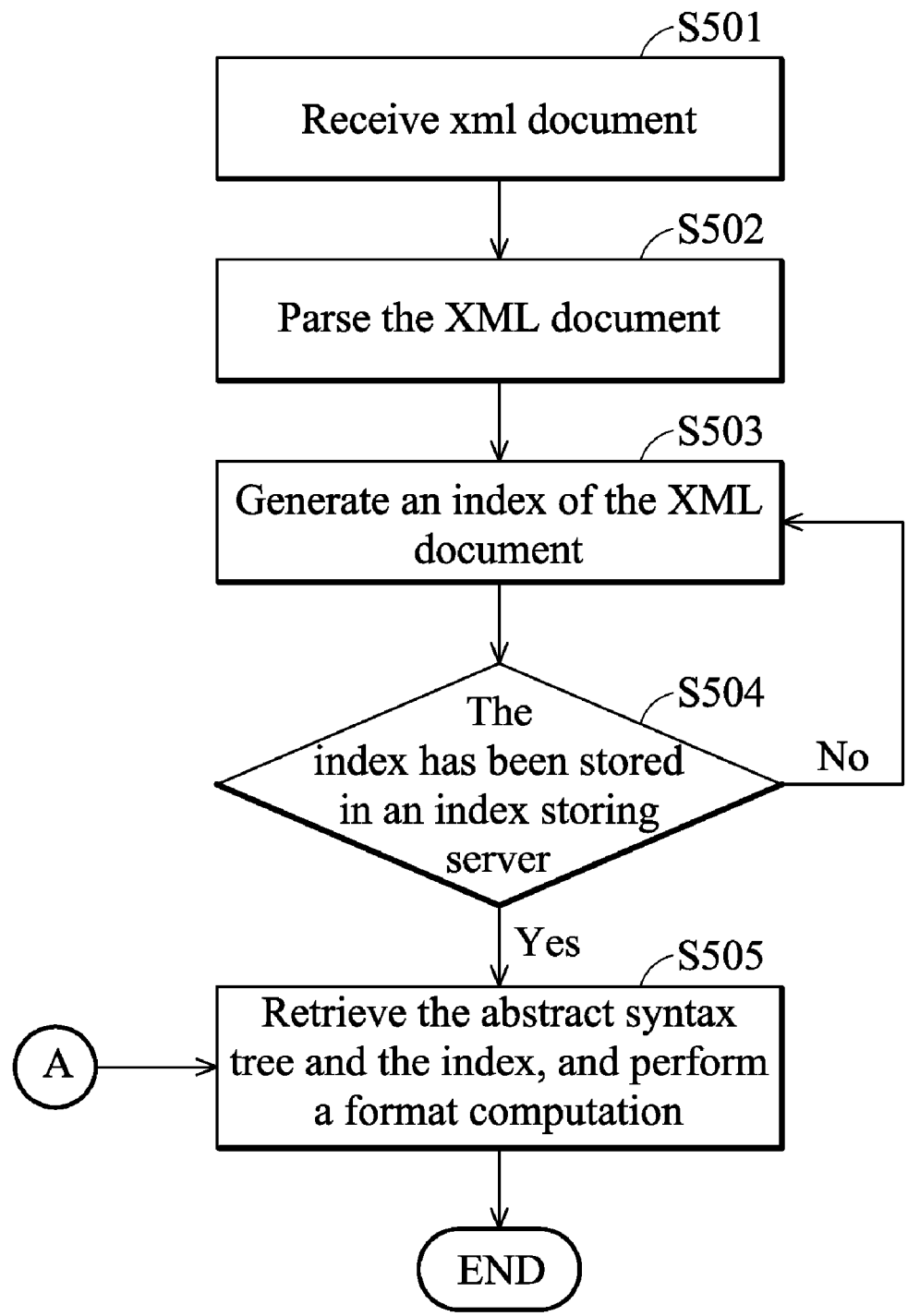

FIGS. 4A and 4B are flowcharts of an embodiment of the streaming query system for extensible markup language.

In step S401, a user-input XPath (Extensible Markup Language Path Language) document is received.

In step S402, the user-input XPath document is analyzed.

In step S403, it is determined whether the XPath document has been stored in an XML Path Language storing server, if so, the method proceeds to step S404, otherwise, the method ends.

In step S404, an abstract syntax tree is built accordingly.

In step S405, it is determined whether there remains a backward axis, if so, the method proceeds to step S406, otherwise, the method proceeds to the steps illustrated in FIG. 4B.

In step S406, the divided process is repeated, then the method returns to step S405 to determine whether any backward axis still remains.

Referring to FIG. 4B, an Extensible Markup Language (XML) document is received in step S501.

In step S502, nodes of the XML document are parsed.

In step S503, an index of the XML document is generated according to the result obtained by analyzing the XML document.

In step S504, it is determined whether the index has been stored in an index storing server.

In step S505, the abstract syntax tree and the index are retrieved, and a format computation is performed to obtain a query result accordingly. The query result is then transmitted or displayed to the user.

As described, according to conventional methods, all query strings are input and processed at one time. As a result, when an XML document exceeds available memory capacity of a system, the system fails to process the XML document. On the other hand, according to the streaming query system and method for extensible markup language of the present invention, the query can be implemented using less system resources. In addition, the method of the present invention is more time efficient than the conventional method.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A streaming query method for extensible markup language, comprising:
   receiving and analyzing a user-input XPath (Extensible Markup Language Path Language) document;
   receiving a result obtained by analyzing the XPath document, and building an abstract syntax tree accordingly, wherein the building of the abstract syntax tree comprises the steps of:
      establishing a single tree structure according to the result obtained by analyzing the XPath document; and
      dividing the single tree structure into independent and undividable tree-structure components;
   receiving an Extensible Markup Language (XML) document, and parsing nodes of the XML document;
   generating an index of the XML document according to the result obtained by analyzing the XML document; and
   receiving the abstract syntax tree and the index, performing a format computation and obtaining a query result accordingly;
   wherein the establishing the single tree structure comprises the steps of:
      when receiving a query string input by a user, loading one line of the query string at a time;
      extracting an axis of the loaded query string;
      generating an operator;
      performing a node test;
      retrieving an operand, and assigning an unspecified variable to the operand;
      establishing a tree structure according to the operator and the operand; and
      determining whether a backward axis exists in the operand, and if the backward axis exists in the operand, reversing the tree structure, otherwise maintaining the original tree structure.

2. The streaming query method for extensible markup language of claim 1, wherein the operator comprises: a child node, a parent node, a descendant node, a following node, a preceding node, a preceding sibling node, a following sibling node.

3. The streaming query method for extensible markup language of claim 1, wherein the node test checks a particular node name or a general representation of a node.

4. The streaming query method for extensible markup language of claim 1, wherein the operand in the tree structure specifies the relationship between nodes, and the operator is a tag specifies characteristics of the node.

5. The streaming query method for extensible markup language of claim 1, wherein the abstract syntax tree dividing process further comprises:
   receiving the single tree structure and extracting the operators from the single tree structure;
   determining whether a backward axis exists;
   separating a linking part of a backward axis in the tree structure in order to divide the tree structure into a plurality of smaller tree structures;
   separating a left sub-tree from the tree structure;
   separating a right sub-tree from the tree structure;
   determining a main structure of the tree structure, and retrieving the second operand counted backward;
   adding the right sub-tree to the left sub-tree to establish a new tree structure.

6. The streaming query method for extensible markup language of claim 5, further determining whether the backward axis exists using a Boolean value.

7. The streaming query method for extensible markup language of claim 1, further storing the analyzed XPath document in an XML Path Language storing server.

8. The streaming query method for extensible markup language of claim 1, further storing the index in an index storing server.

* * * * *